United States Patent [19]  
Wing

[11] Patent Number: 4,624,155  
[45] Date of Patent: Nov. 25, 1986

[54] TENSION LIMITER FOR LINKAGES

[75] Inventor: George S. Wing, Palos Verdes Estates, Calif.

[73] Assignee: Hi-Shear Corporation, Torrance, Calif.

[21] Appl. No.: 747,686

[22] Filed: Jun. 21, 1985

Related U.S. Application Data

[63] Continuation of Ser. No. 552,848, Nov. 16, 1983, abandoned, which is a continuation of Ser. No. 353,392, Mar. 1, 1982, abandoned, which is a continuation of Ser. No. 182,579, Aug. 29, 1980, abandoned, which is a continuation of Ser. No. 913,967, Jun. 9, 1978, abandoned.

[51] Int. Cl.⁴ ............................................. F16C 1/00
[52] U.S. Cl. .................................. 74/501 R; 74/581; 403/209; 403/213
[58] Field of Search ...................... 74/581, 584, 501.5; 403/27, 209, 213; 267/69; 116/212; 24/115 F

[56] References Cited

U.S. PATENT DOCUMENTS

| | | | |
|---|---|---|---|
| 519,617 | 5/1984 | Power | 74/501.5 |
| 793,325 | 6/1905 | Stiles | 403/209 |
| 861,728 | 7/1907 | Hutchens | 403/213 |
| 2,077,222 | 4/1937 | Creager | 403/209 |
| 2,991,524 | 7/1961 | Dobrikin | 24/73 |
| 4,027,748 | 6/1977 | Persson | 403/209 |

Primary Examiner—Gary L. Smith  
Assistant Examiner—Rodney M. Lindsey  
Attorney, Agent, or Firm—Donald D. Mon

[57] ABSTRACT

A tension limiter comprises a rigid body bearing a pair of deflector members which establish a bent path along the body. A stiffly bendable elongated rod extends along the bent path. The rod and the body are connected into a linkage so as to form a part of the linkage. When a tensile force above a datum value is applied to the tensioner the rod is pulled along the bent path, being bent as it moves, and this elongates the tensioner until the tensile force in the linkage is relieved to the datum value, thereby establishing the tension in the linkage at the datum value.

5 Claims, 8 Drawing Figures

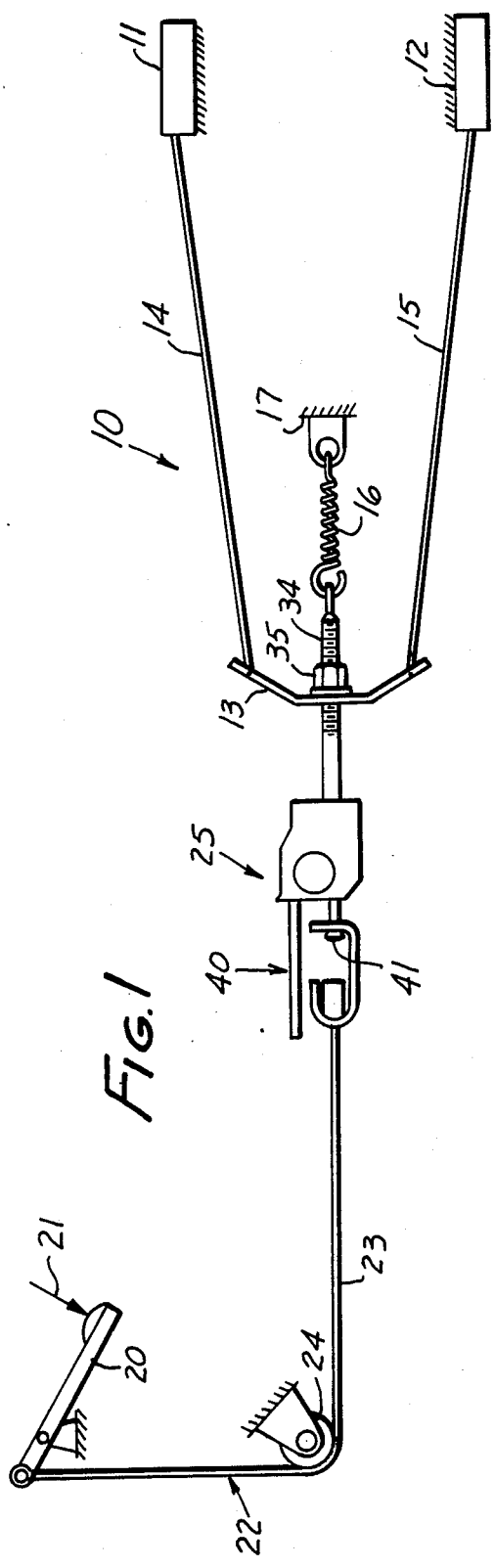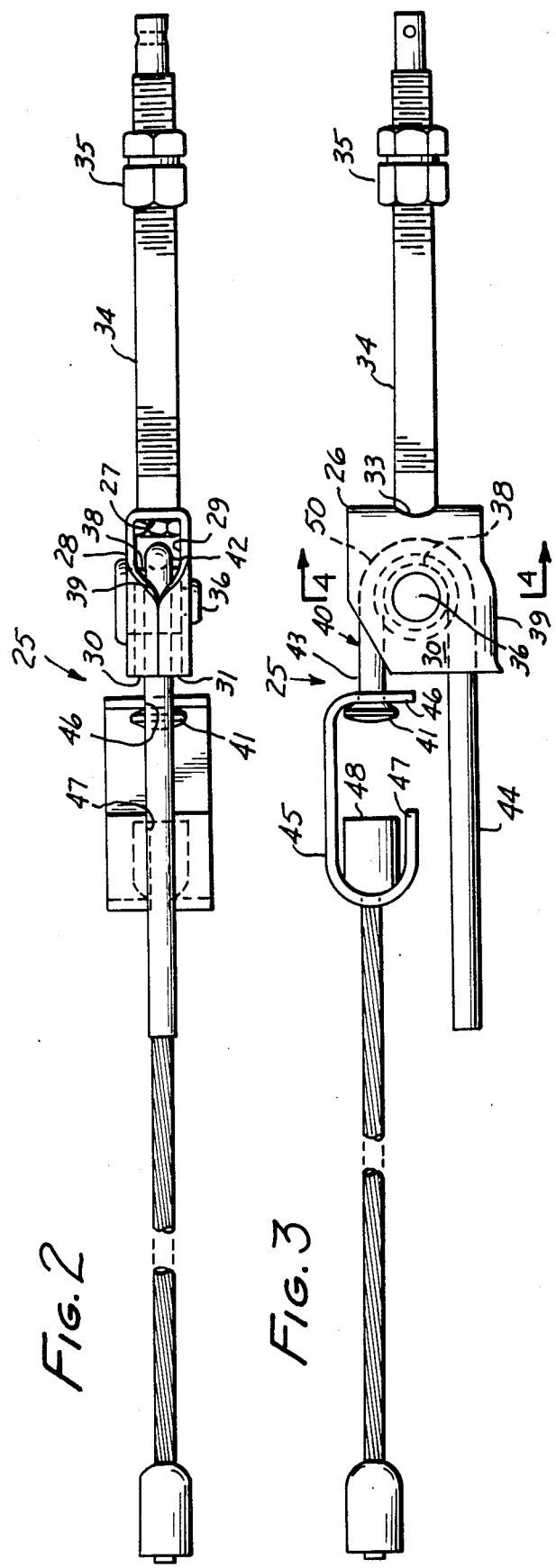

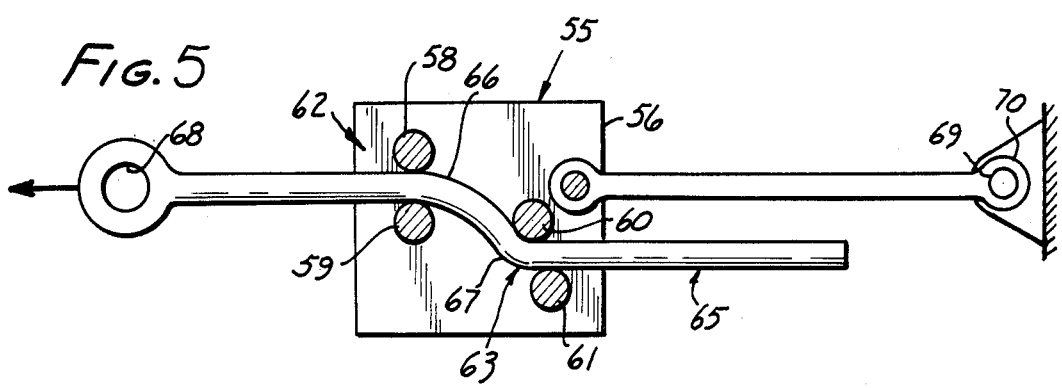
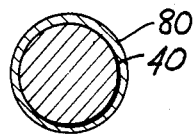
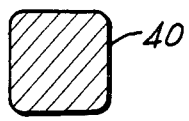
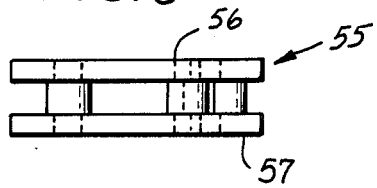
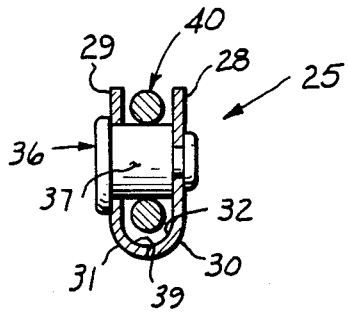

TENSION LIMITER FOR LINKAGES

CROSS-REFERENCE TO CO-PENDING APPLICATION

This is a continuation of applicant's patent application Ser. No. 552,848, filed Nov. 16, 1983, which in turn was a continuation of Ser. No. 353,392, filed Mar. 1, 1982, which in turn was a continuation of Ser. No. 182,579, filed Aug. 29, 1980, which in turn was a continuation of Ser. No. 913,967, filed June 9, 1978 all of which are now abandoned.

This invention relates to tensioner limiter (sometimes called a "linkage tensioner").

Especially in foot brake (manual) linkage systems, it is conventional at the time of rigging the same to make a one-time adjustment of the tension in the linkage. A frequently-encountered datum value for this purpose is 600 lb. tension, and this tension remains in the linkage to assure that the linkage is uniformly prestressed at all times. Tensioning techniques are known in the art, and they conventionally utilize ordinary rigging devices. However, these are troublesome to use, and they require that the installer utilize care in reading a tensionmeter. This also requires that he be careful enough to adjust the tension to a desired value. It also involves the risk that the tensionmeter might itself be inaccurate.

It is an object of this invention to provide a tensioner limiter which at tensile forces above the datum value will elongate to relieve the forces in excessive of the datum value and then stop elongating, thereby establishing the tension in the system at the datum value. This is a one-time procedure, and the repeatability from linkage system to linkage system is a function of easily maintained care and quality in manufacturing the tension limiter rather than of questionable judgment or care by the installer.

A tension limiter according to this invention includes a rigid body which carries a pair of deflector members that establish a bent path along the rigid body. A stiffly bendable elongated rod extends along the bent path. First attachment means is provided for connecting the rod to the linkage, and second attachment means is provided for connecting the body to the linkage. With the linkage tensioner connected in the linkage, it forms a part of the linkage, and a tensile force above a datum value bends the rod and pulls it along the path, thereby elongating the tensioner until the tensile force of the linkage is relieved to a datum value, thereby establishing tension in the linkage at the datum value.

According to a preferred but optional feature of the invention, the rod is bent in a U-shape to form a bight and a pair of legs. The first attachment means is attached to one of the legs and a first one of the deflector members is disposed inside the bight to retain the rod to the body. The other deflector member bears against the other of said legs. The two deflector members thereby maintain the shape of the path.

The above and other features of this invention will be fully understood from the following detailed description and the accompanying drawings, in which:

FIG. 1 is an elevation partly in schematic notation, showing the presently preferred embodiment of the invention;

FIG. 2 is a top view of a portion of FIG. 1;

FIG. 3 is a side view of FIG. 2;

FIG. 4 is a cross-section taken at line 4—4 in FIG. 3;

FIG. 5 is a cross-section of another embodiment of the invention;

FIGS. 6 and 7 are cross-sections showing useful sections of a portion of the device of the invention; and FIG. 8 is a top view of a portion of FIG. 5.

FIG. 1 shows a brake system 10 wherein a pair of schematically illustrated brakes 11, 12 for the rear wheels of an automobile are disclosed. A yoke 13 receives ends of cables 14 and 15 which are respectively connected to brakes 11 and 12. A return spring 16 is fastened to the automobile frame 17 tending to bias the system to the right in FIG. 1.

A brake pedal 20 is pivotally mounted to the frame. When a force schematically shown by arrow 21 is applied, such as by the hand or by the foot, the system is put into tension, and the brakes are applied. A linkage 22 connects the brake pedal to the brakes through the yoke.

The linkage includes a cable 23, the yoke, and cables 14 and 15. A sheave 24 is shown as a guide of the type frequently used in brake systems. Linkage 22 is completed by the linkage tensioner 25 which forms a part of it.

The tension limiter includes a body 26 in the general form of a clevis with a clevis base 27 and a pair of arms 28, 29. Arms 28 and 29 have shoulders 30, 31 respectively, and between the shoulders and the arms there is a channel 32. The base has a perforation 33 therethrough which passes the shank of a headed bolt 34 (sometimes called "connector means"), but restrains the head. The yoke is mounted to the bolt and is held to it by a nut 35 threaded onto the bolt.

The body carries a first deflector means 36 which is a pin 37 that is fixed to both of the clevis arms and extends between them. It has a circular periphery 38 for reasons yet to be described. Second deflector means 39 comprises the inside surface of the shoulders 30, 31.

A stiffly bendable elongated rod 40 has a head 41 (sometimes called "connector means") at one end, and is bent into a general U-shape having a bight 42 and a pair of arms 43, 44 respectively. Arm 43 carries head 41 while arm 44 extends freely away from the bight. The first deflector means holds the rod in the body by engaging the bight, and arm 44 bears against the second deflector means.

A clip 45 has a slot 46, the walls of which engage head 41. It also includes a slot 47 by means of which a head 48 on cable 22 is received. It will now be seen that the linkage tensioner forms a link in the total linkage system and tension can be applied to it by pulling on cable 22 and on bolt 34.

It will be observed that the combination of the two deflector means provides a bent path 50 which in this case is U-shaped. Pulling on the linkage with a force yet to be described will cause the rod to move along its axis on this path, for purposes yet to be disclosed.

FIG. 5 shows another embodiment of the invention wherein a body 55 comprises a pair of plates 56, 57 connected by pins 58, 59, 60, 61. Pins 58 and 59 together form a first deflector member 62 and pins 60 and 61 form a second deflector member 63. These pins act as respective guides permitting the passage of rod 65. Rod 65 has the same physical properties as rod 40. The guides are offset from one another so that the first guide comprising deflector member 62 causes a first bend 66 in the rod. The second deflector member causes a second bend 67, these bends being reverse relative to one another. The connection of the rod to the linkage system is by means of an eye 68 (sometimes called "connector means") and the connection of the body in the linkage is by means of pin 69 and eye 70 (sometimes called "connector means") as shown.

FIGS. 6 and 7 show that the rod can have different cross-sections. In FIG. 6, rod 40 is shown with a circular cross-section. In FIG. 7, rod 40 is shown with a square cross-section. Other cross-sections could of course be selected instead.

The pin is preferably made of steel, for example 1010 carbon steel, preferably phosphate treated to provide a unitary phosphate layer which tends to retain oil or other lubricant, thereby to standardize the friction reaction. Both body constructions and deflector means could similarly be treated and lubricated because this will reduce the variables in the reaction of the parts with one another. The rod is preferably annealed.

In FIG. 6, a layer 80 of such a lubricant is shown. It may be applied to any rod. The thickness of the layer in the drawings is exaggerated for purposes of illustration.

The force needed to pull the rod past the bends varies with the diameter or cross-sectional area, and also with its hardness. Persons skilled in the art will have no difficulty in selecting the parameters of the device such as to create a pre-selected reaction to a pull to a datum tensile force and greater on the linkage tensioner.

In operation, the brake pedal is depressed until the tensile force exerted on the tension limiter exceeds the datum value. A typical datum value for brake adjustment is 600 lbs. pull. Exceeding that pull will cause the linkage to pull the rod through the body so long as the tensile force substantially exceeds the datum force. So long as this occurs, the tensioner will relieve the force by permitting the rod to creep relative to the body. This is a self-relieving situation, and as soon as the tensile force has been reduced to the datum value, for example 600 lbs., then creeping stops, and the linkage remains adjusted with the predetermined tension in the system. This residual tension in linkage systems will be understood by any skilled rigger.

In the embodiments of FIGS. 1-4, the force is resisted primarily by the movement of the bend along the axial length of the rod. There will of course be some frictional resistance, but it is intended that this be reduced as far as possible for example by providing a good surface lubricant.

In the embodiment of FIG. 5, the two bends produce the same type of reaction.

As an example of a suitable rod-like member, a suitable dimension for a 600 lb. resistance is a rod approximately 0.1915 inches diameter, with an inside radius of the bight of approximately 0.188 inches. The material is carbon steel 1010 fully annealed and preferably phosphate finished and oiled.

This invention thereby provides a tension limiter which is self-relieving to a predetermined datum value, leaving the system at the predetermined maximum tension.

This invention is not to be limited by the embodiments shown in the drawings and described in the description which are given by way of example and not of limitation, but only in accordance with the scope of the appended claims.

I claim:

1. A tension limiter adapted to be placed in tension in a system which system has a first portion and a second portion that are placed in tension, said tension limiter forming a link in said system joining said portions and transmitting tensile forces between them, comprising:
   a rigid body comprising a clevis
   a pair of smooth deflector members carried by said rigid body which establish a bent path; and
   a pre-bent stiffly bendable elongated rod having a smooth, continuous outer surface, a connection end, a free end, and a bend along its length which conforms to said bent path, said rod being in free and unclamped sliding contact with said deflector members, said rigid body and deflector members making only a said free and unclamped sliding contact with said rod, said rod being bent in a U-shape to form a bight and a pair of legs, a first of said deflector members being disposed inside the bight to retain the rod to the body, and the other of said deflector members bearing against the other of said legs, the two deflector members thereby maintaining the shape of the path, said first deflector member being a pin connected to the body across said clevis, and said second deflector member comprising a shoulder on said clevis,
   one of said legs being adapted for connection to one of said portions of said linkage to receive tensile force;
   said rigid body being adapted for connection to the other of said portions;
   the dimensions of the bend and of the rod, and the properties of material of which the rod is made, including tensile strength and rigidity being established such that there is a predetermined datum value of tension load across said portions below which the rod cannot be pulled along said bent path with progressive yielding deformation in bending of successive regions of said rod as they move into and out of engagement with at least one of said deflector members, and above which said yielding deformation does occur until tension in the system is reduced to said predetermined datum value of tension load, whereby the maximum tension load in said system is limited to said datum value of tension load by the linkage tensioner acting as a yielding link, said datum value of tension load being substantially greater than the tension load which would overcome friction forces generated between said rod and said body and deflection members.

2. A tension limiter to claim 1 in which said rod is steel, and is coated with a lubricant-retaining layer.

3. A tension limiter according to claim 2 in which said layer is phosphate integral with the steel.

4. A tension limiter adapted to be placed in tension in a system which system has a first portion and a second portion that are placed in tension, said tension limiter forming a link in said system joining said portions and transmitting tensile forces between them, comprising:
   a rigid body;
   a pair of smooth deflector members carried by said rigid body which establish a bent path; and
   a pre-bent stiffly bendable elongated rod having a smooth, continuous outer surface, a connection end, a free end, and a bend along its length which conforms to said bent path, said rod being in free and unclamped sliding contact with said rod; said rod being adapted for connection to one of said portions of said linkage to receive tensile force;
   said rigid body being adapted for connection to the other of said portions;

the dimensions of the bend and of the rod, and the properties of material of which the rod is made, including tensile strength and rigidity being estabIshed such that there is a predetermined datum value of tension load across said portions below which the rod cannot be pulled along said bent path with progressive yielding deformation in bending of successive regions of said rod as they move into and out of engagement with at least one of said deflector members, and above which said yielding does occur until tension in the system is reduced to said predetermined datum value of tension load, whereby the maximum tension load in said system is limited to said datum value of tension load by the linkage tensioner acting as a yielding link, said datum value of tension load being substantially greater than the tension load which would overcome friction forces generated between said rod and said body and deflector members, said rod being made of steel, and being coated with a lubricant-retaining layer.

5. A linkage tension according to claim 4 in which said layer is phosphate integral with the steel.

* * * * *